(12) United States Patent
Jhang Jian (10) Patent No.: US 10,587,303 B2
(45) Date of Patent: Mar. 10, 2020

(54) TRANSCEIVER CONTROL CIRCUIT FOR REDUCING OPERATING MODE TRANSITION PERIOD OF TRANSCEIVER

(71) Applicant: Realtek Semiconductor Corp., Hsinchu (TW)

(72) Inventor: Sie-Siou Jhang Jian, Tainan (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/525,251

(22) Filed: Jul. 29, 2019

(65) Prior Publication Data

US 2020/0036408 A1 Jan. 30, 2020

(30) Foreign Application Priority Data

Jul. 30, 2018 (TW) .............................. 107126343 A (51) Int. Cl.
*H04B 1/40* (2015.01)
*H03K 5/00* (2006.01)
*H04B 1/44* (2006.01)

(52) U.S. Cl.
CPC ..................................... *H04B 1/44* (2013.01)

(58) Field of Classification Search
None
See application file for complete search history.

(56) References Cited

U.S. PATENT DOCUMENTS

| 7,233,772 | B1 * | 6/2007 | Darabi | H03B 21/01 |
| | | | | 323/237 |
| 7,982,533 | B2 * | 7/2011 | Fan | H03H 11/22 |
| | | | | 327/552 |
| 8,260,212 | B2 * | 9/2012 | Chien | H03H 11/1291 |
| | | | | 455/73 |
| 8,666,326 | B2 * | 3/2014 | Chien | H03H 11/1291 |
| | | | | 455/73 |
| 8,797,097 | B2 * | 8/2014 | Chiu | H03H 11/126 |
| | | | | 327/552 |

(Continued)

FOREIGN PATENT DOCUMENTS

TW        200410507 A       6/2004

OTHER PUBLICATIONS

Taiwanese Office Communication for TW 107126343, search completion date Jan. 9, 2019 (with partial English translation).

*Primary Examiner* — Tuan A Tran
(74) *Attorney, Agent, or Firm* — Birch, Stewart, Kolasch & Birch, LLP (57) ABSTRACT

A transceiver control circuit of a transceiver is disclosed including: a receiver circuit; a transmitter circuit; a shared filtering circuit shared by the receiver circuit and the transmitter circuit; a first mode-switch for switching signal input paths of the shared filtering circuit; a second mode-switch for switching signal output paths of the shared filtering circuit; a mode-switch control circuit for controlling the first mode-switch and the second mode-switch; a short-circuit switch coupled between two output terminals of a filter within the shared filtering circuit; and a short-circuit switch control circuit. In a period during which the transceiver transits from a receiving mode to a transmitting mode, the short-circuit switch control circuit turns on the short-circuit switch for a certain period and then turns off the short-circuit switch.

8 Claims, 5 Drawing Sheets

(56) References Cited

U.S. PATENT DOCUMENTS

| | | | |
|---|---|---|---|
| 9,219,512 B2* | 12/2015 | Khoini-Poorfard | H04B 1/30 |
| 10,009,060 B2* | 6/2018 | Chiang | H03H 11/1291 |
| 2005/0048928 A1* | 3/2005 | Jeon | H04B 1/1027 |
| | | | 455/78 |
| 2008/0002597 A1 | 1/2008 | Fan et al. | |
| 2012/0322394 A1* | 12/2012 | Chien | H03H 11/1291 |
| | | | 455/84 |
| 2016/0134258 A1* | 5/2016 | Chiang | H03H 11/1291 |
| | | | 455/78 |
| 2017/0018378 A1 | 1/2017 | Khlat et al. | |

* cited by examiner

TRANSCEIVER CONTROL CIRCUIT FOR REDUCING OPERATING MODE TRANSITION PERIOD OF TRANSCEIVER

CROSS-REFERENCE TO RELATED APPLICATIONS

This application claims the benefit of priority to Patent Application No. 107126343, filed in Taiwan on Jul. 30, 2018; the entirety of which is incorporated herein by reference for all purposes.

BACKGROUND

The disclosure generally relates to a transceiver and, more particularly, to a transceiver control circuit capable of reducing the operating mode transition period of a transceiver.

A transceiver is required to process signal to be transmitted from or received by the wireless communication device. In order to reduce the circuit area and the hardware cost, the transmitter circuit and the receiver circuit of some transceivers commonly share part of the circuit components. When the transceiver needs to switch from a receiving mode to a transmitting mode, the transceiver needs to wait for the circuit components shared by the transmitter circuit and the receiver circuit to finish the initialization procedure before entering into the transmitting mode to begin transmitting signals. In other words, the transceiver has to experience an operating mode transition period when switches from the receiving mode to the transmitting mode.

However, some application environments have strict restrictions on the length of operating mode transition period for the transceiver. If the operating mode transition period cannot be effectively reduced, it may cause the transceiver unable to meet the specification requirements of relevant applications.

SUMMARY

An example embodiment of a transceiver control circuit is disclosed, comprising: a receiver circuit, arranged to operably process signals received by the transceiver; a transmitter circuit, arranged to operably process signals to be transmitted by the transceiver; a shared filtering circuit, comprising a plurality of filters and commonly shared by the receiver circuit and the transmitter circuit; a first mode-switch, coupling with an input terminal of the shared filtering circuit, arranged to operably switch signal input paths of the shared filtering circuit; a second mode-switch, coupling with an output terminal of the shared filtering circuit, arranged to operably switch signal output paths of the shared filtering circuit; a mode-switch control circuit, arranged to operably control operations of the first mode-switch and the second mode-switch; a first short-circuit switch, coupled between two differential output terminals of one filter in the plurality of filters; and a short-circuit switch control circuit, arranged to operably control operations of the first short-circuit switch; wherein in a first transition period during which the transceiver transitions from a receiving mode to a transmitting mode, the short-circuit switch control circuit turns on the first short-circuit switch for a first predetermined length of time and then turns off the first short-circuit switch.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
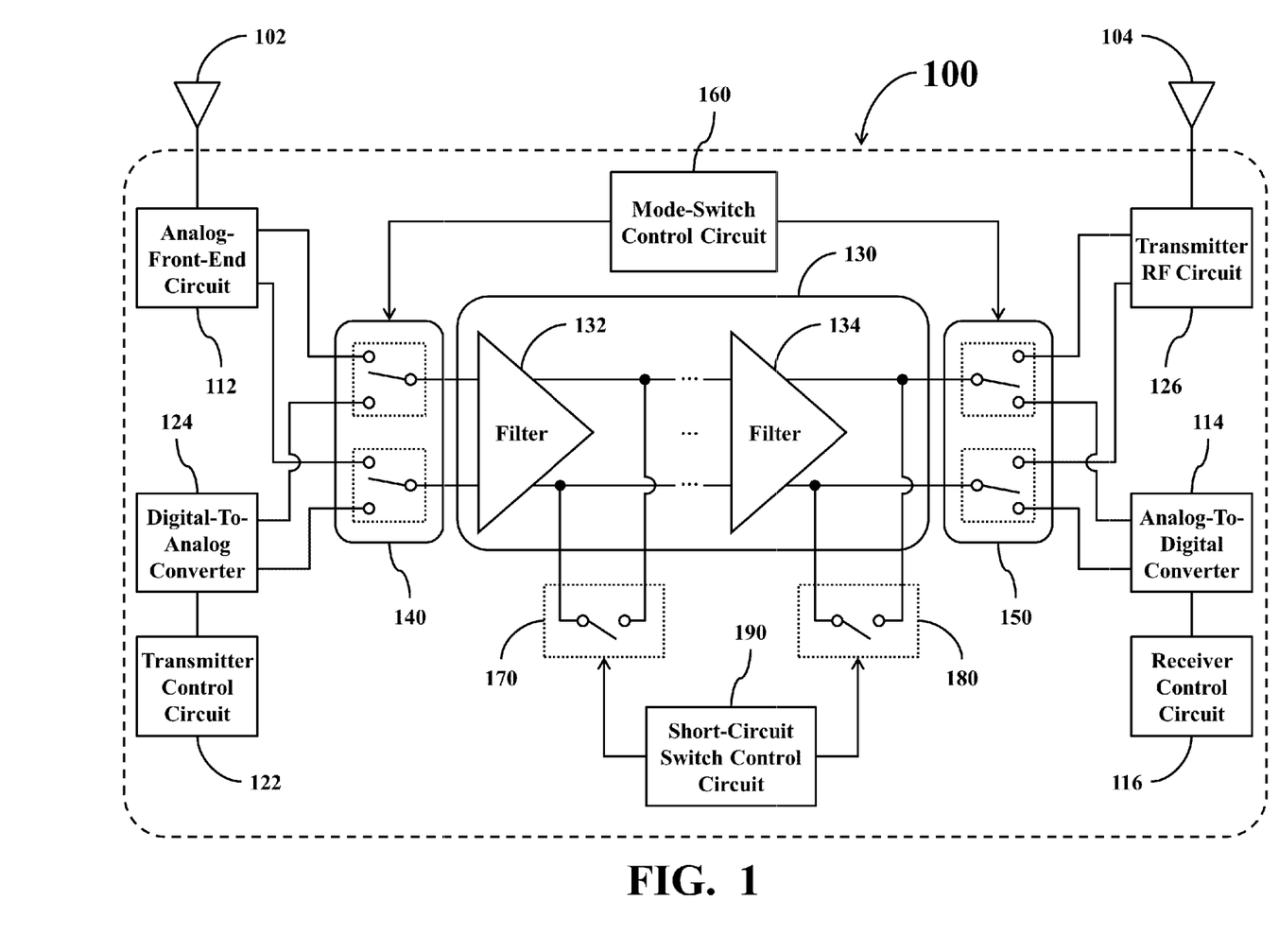
FIG. 1 shows a simplified functional block diagram of a transceiver control circuit according to one embodiment of the present disclosure.

FIG. 1 shows a simplified functional block diagram of a transceiver control circuit 100 according to one embodiment of the present disclosure. The transceiver control circuit 100 may receive wireless signals transmitted from other devices through a receiving antenna 102, and may transmit wireless signals to other devices through a transmitting antenna 104.

As shown in FIG. 1, the transceiver control circuit 100 comprises an analog-front-end circuit 112, an analog-to-digital converter 114, a receiver control circuit 116, a transmitter control circuit 122, a digital-to-analog converter 124, a transmitter RF circuit 126, a shared filtering circuit 130, a first mode-switch 140, a second mode-switch 150, a mode-switch control circuit 160, multiple short-circuit switches (e.g., the exemplary first short-circuit switch 170 and the second short-circuit switch 180 shown in FIG. 1), and a short-circuit switch control circuit 190.

In the transceiver control circuit 100, the analog-front-end circuit 112, the analog-to-digital converter 114, and the receiver control circuit 116 collectively form the main body of a receiver circuit. On the other hand, the transmitter control circuit 122, the digital-to-analog converter 124, and the transmitter RF circuit 126 collectively form the main body of a transmitter circuit.

The shared filtering circuit 130 is coupled with the foregoing receiver circuit and the transmitter circuit, and may be commonly shared by the receiver circuit and the transmitter circuit. In operations, the receiver circuit and the transmitter circuit may share the same shared filtering circuit 130 by means of timesharing to simplify the circuitry complexity, thereby reducing the circuit area and the hardware cost of the transceiver control circuit 100.

The shared filtering circuit 130 comprises a plurality of filters adopting differential output structure (e.g., the exemplary filters 132 and 134 shown in FIG. 1). In practice, the shared filtering circuit 130 may further comprise other circuit stages, such as amplifier circuits, driver circuits, or the like. In some embodiments, the foregoing filter 132 and/or the filter 134 may be configured to have signal amplification function to serve as a signal amplifier at the same time.

The first mode-switch 140 is coupled with the input terminal of the shared filtering circuit 130, and may be employed to switch the signal input path of the shared filtering circuit 130. The second mode-switch 150 is coupled with the output terminal of the shared filtering circuit 130, and may be employed to switch the signal output path of the shared filtering circuit 130.

The mode-switch control circuit 160 is coupled with the first mode-switch 140 and the second mode-switch 150, and arranged to operably control the operations of the first mode-switch 140 and the second mode-switch 150 according to the operating mode of the transceiver.

In the present embodiment, the first short-circuit switch 170 is coupled between two differential output terminals of the filter 132, and arranged to operably render the two differential output terminals of the filter 132 become a short-circuit when needed. The second short-circuit switch 180 is coupled between two differential output terminals of the filter 134, and arranged to operably render the two differential output terminals of the filter 134 become a short-circuit when needed.

The short-circuit switch control circuit 190 is coupled with the first short-circuit switch 170 and the second short-circuit switch 180, and arranged to operably control the operations of the first short-circuit switch 170 and the second short-circuit switch 180.

In practice, a corresponding short-circuit switch controlled by the short-circuit switch control circuit 190 may be arranged after each filter of the shared filtering circuit 130.

Different functional blocks of the transceiver control circuit 100 may be realized with separate circuits, or may be integrated into a single circuit chip. Each of the foregoing first mode-switch 140 and the second mode-switch 150 may be realized with a combination of multiple suitable transistors. Each of the foregoing first short-circuit switch 170 and the second short-circuit switch 180 may be realized with a single transistor or a combination of multiple suitable transistors.

Figure 2:
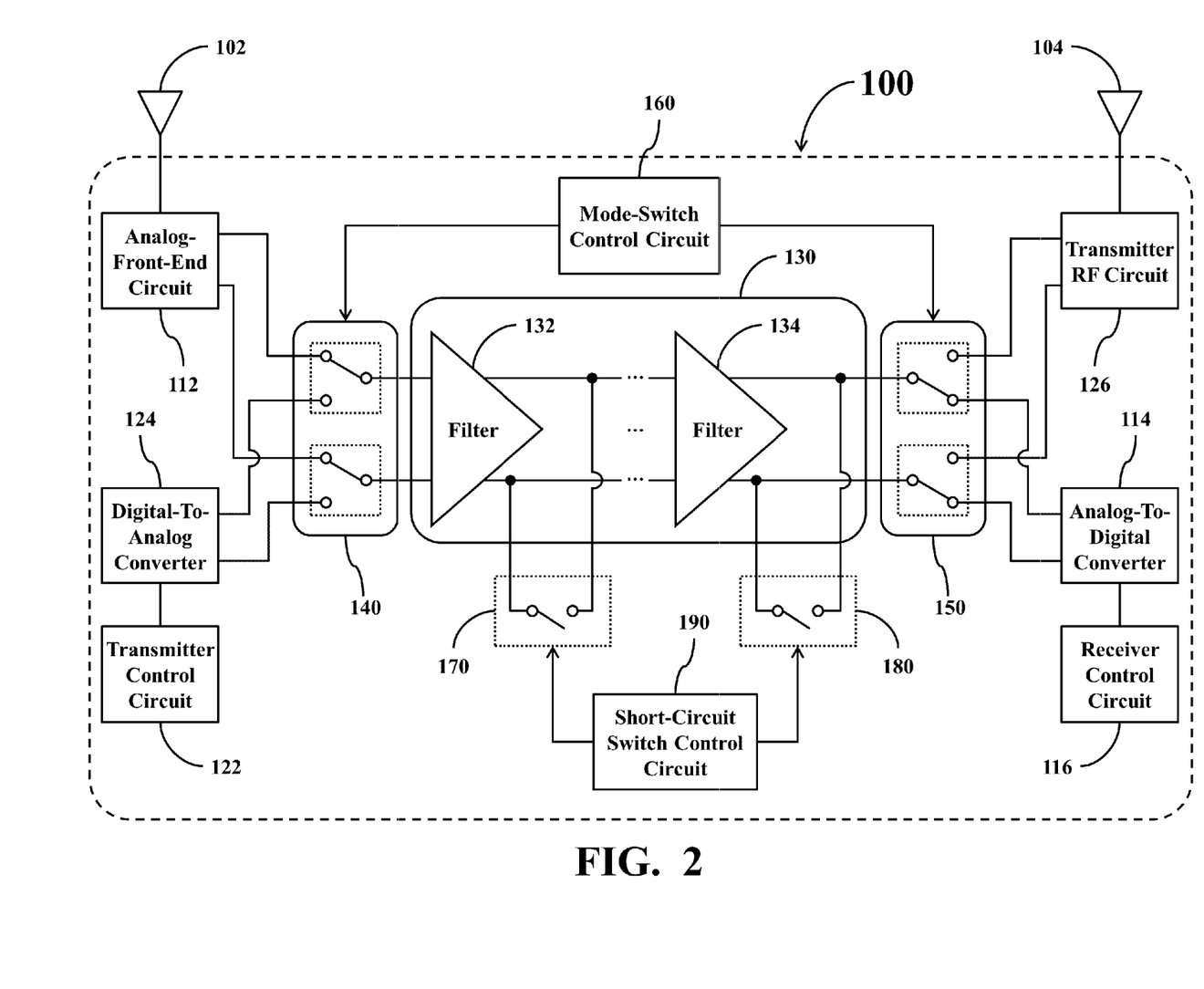
FIG. 2 shows a simplified schematic diagram of the operation of the transceiver control circuit of FIG. 1 in a receiving mode.
Figure 3:
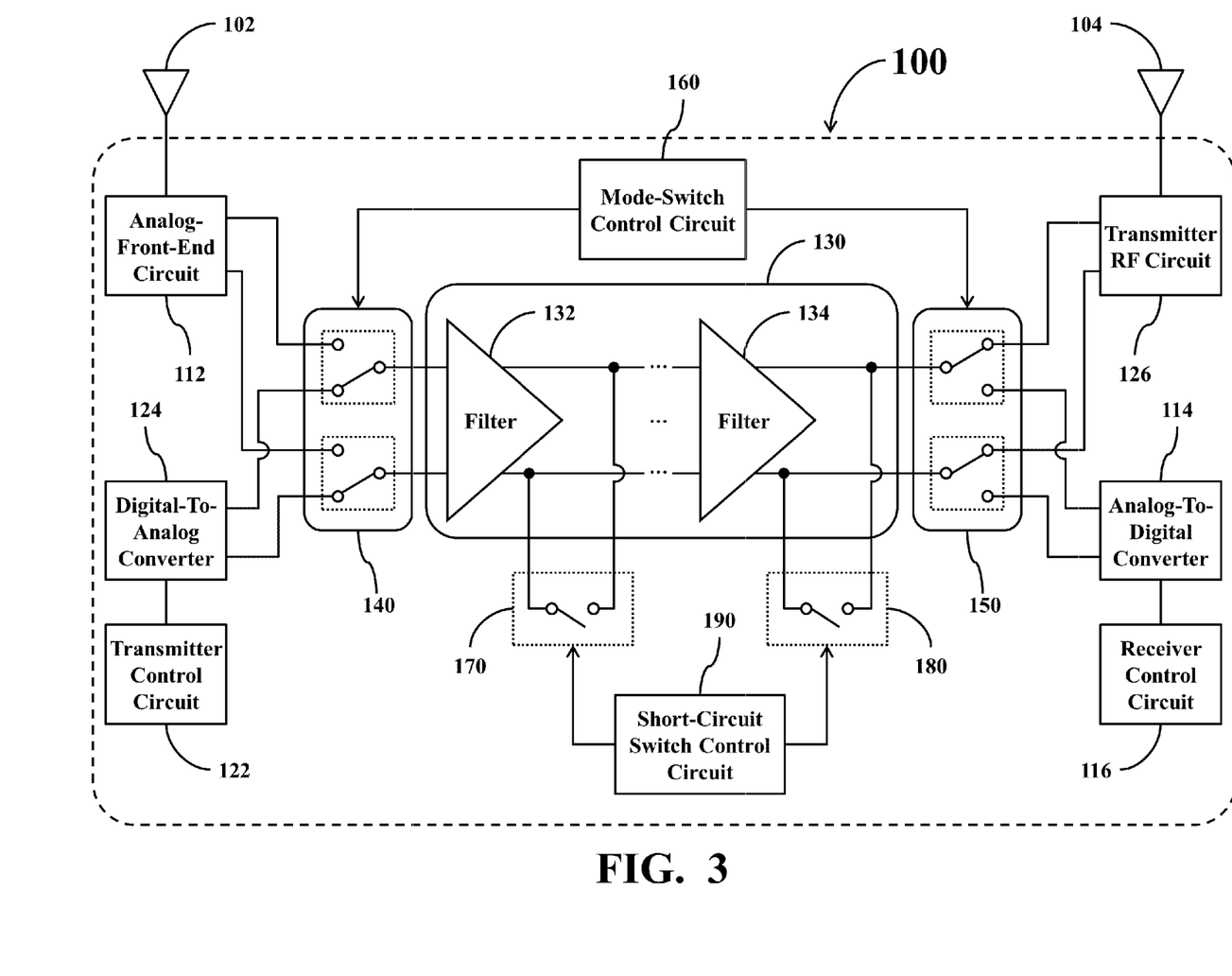
FIG. 3 shows a simplified schematic diagram of the operation of the transceiver control circuit of FIG. 1 in a transmitting mode.

The operations of the transceiver control circuit 100 will be further described in the following by reference to FIG. 2 and FIG. 3. FIG. 2 shows a simplified schematic diagram of the operation of the transceiver control circuit of FIG. 1 in a receiving mode. FIG. 3 shows a simplified schematic diagram of the operation of the transceiver control circuit of FIG. 1 in a transmitting mode.

As shown in FIG. 2, when the transceiver operates under a receiving mode, the mode-switch control circuit 160 of the transceiver control circuit 100 controls the first mode-switch 140 to couple the signal input paths of the shared filtering circuit 130 with a corresponding circuit of the receiver circuit (e.g., the analog-front-end circuit 112 in the present embodiment). At the same time, the mode-switch control circuit 160 also controls the second mode-switch 150 to couple signal output paths of the shared filtering circuit 130 with a corresponding circuit of the receiver circuit (e.g., the analog-to-digital converter 114 in the present embodiment).

Therefore, when the transceiver operates under the receiving mode, signals received by the receiving antenna 102 are processed by the analog-front-end circuit 112 and the shared filtering circuit 130 in turn, and then transmitted to the analog-to-digital converter 114 for further processing. After that, the analog-to-digital converter 114 transmits the processed signals to the receiver control circuit 116.

As shown in FIG. 3, when the transceiver operates under a transmitting mode, the mode-switch control circuit 160 of the transceiver control circuit 100 controls the first mode-switch 140 to couple the signal input paths of the shared filtering circuit 130 with a corresponding circuit of the transmitter circuit (e.g., the digital-to-analog converter 124 in the present embodiment). At the same time, the mode-switch control circuit 160 also controls the second mode-switch 150 to couple the signal output paths of the shared filtering circuit 130 with a corresponding circuit of the transmitter circuit (e.g., the transmitter RF circuit 126 in the present embodiment).

Therefore, when the transceiver operates under the transmitting mode, signals generated by the transmitter control circuit 122 are processed by the digital-to-analog converter 124 and the shared filtering circuit 130 in turn, and then transmitted to the transmitter RF circuit 126 for further processing. After that, the transmitter RF circuit 126 transmits the processed signals to other devices through the transmitting antenna 104.

In a transition period during which the operating mode of the transceiver transitions from the receiving mode to the transmitting mode, the short-circuit switch control circuit 190 turns on the first short-circuit switch 170 for a first predetermined length of time to render the two differential output terminals of the filter 132 become a short-circuit, and then turns off the first short-circuit switch 170. Additionally, during the aforementioned transition period, the short-circuit switch control circuit 190 also turns on the second short-circuit switch 180 for a second predetermined length of time to render the two differential output terminals of the filter 134 become a short-circuit, and then turns off the second short-circuit switch 180.

In operations, the short-circuit switch control circuit 190 may begin to turn on the first short-circuit switch 170 and the second short-circuit switch 180 when the mode-switch control circuit 160 controls the first mode-switch 140 to switch the signal input paths of the shared filtering circuit 130 from the receiver circuit to the transmitter circuit.

In practice, the foregoing first predetermined length of time and the second predetermined length of time are both longer than or equal to a settling time of the digital-to-analog converter 124. Please note that the first predetermined length of time and the second predetermined length of time may be substantially the same, or may be different from each other.

The settling speed of the filter 132 coupled with the first short-circuit switch 170 can be significantly increased by utilizing the short-circuit switch control circuit 190 to turn on the first short-circuit switch 170 for a period of time and then turns off the first short-circuit switch 170. Similarly, the settling speed of the filter 134 coupled with the second short-circuit switch 180 can be significantly increased by utilizing the short-circuit switch control circuit 190 to turn on the second short-circuit switch 180 for a period of time and then turns off the second short-circuit switch 180. As a result, the time required for the shared filtering circuit 130 to complete the initialization procedure during the foregoing transition period can be effectively reduced, thereby reducing the length of the aforementioned transition period.

In other words, with the cooperation of the foregoing multiple short-circuit switches and the short-circuit switch control circuit 190, the transition period required for the transceiver to transition from the receiving mode to the transmitting mode can be effectively reduced, and therefore the operating mode switching speed of the transceiver can be increased.

In addition, during the foregoing transition period, the short-circuit switch control circuit 190 turns on the first short-circuit switch 170 and the second short-circuit switch 180 only for a period of time before turning off these short-circuit switches. Such approach effectively prevents the transceiver control circuit 100 from generating and transmitting erroneous signals to the transmitting antenna 104 during the transition period.

On the other hand, in the transition period during which the transceiver transitions from the transmitting mode to the receiving mode, the short-circuit switch control circuit 190 keeps the first short-circuit switch 170 and the second short-circuit switch 180 in the turn-off status.

Please note that the foregoing circuit structure in FIG. 1 merely serves as an exemplary embodiment, rather than a restriction to practical implementations.

In practice, the quantity and positions of the short-circuit switches employed in the foregoing transceiver control circuit 100 may be modified depending on the need of practical circuit design, and not restricted to the patterns illustrated in the foregoing embodiment.

Figure 4:
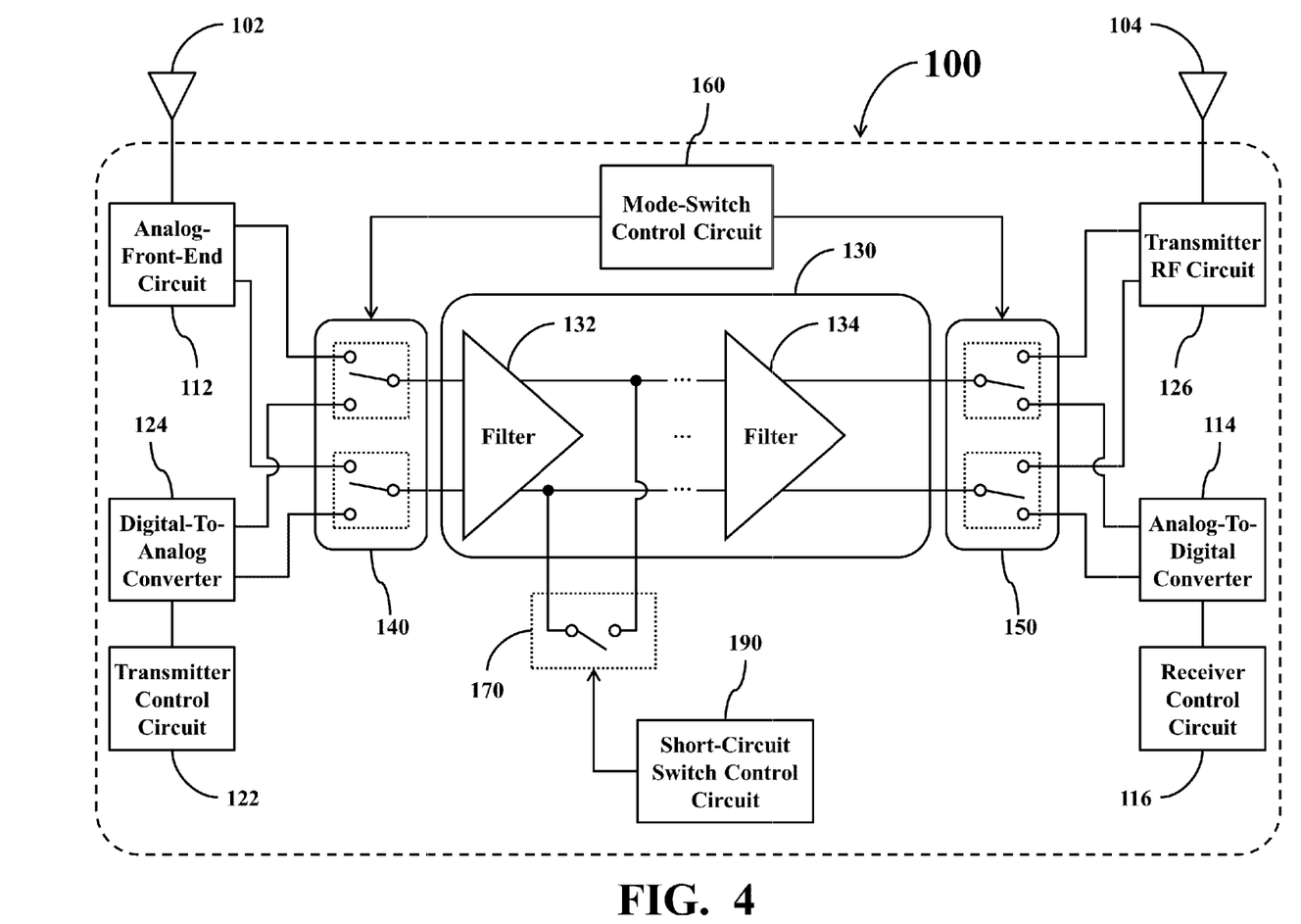
FIG. 4 and FIG. 5 show simplified functional block diagrams of a transceiver control circuit according to other embodiments of the present disclosure.
Figure 5:
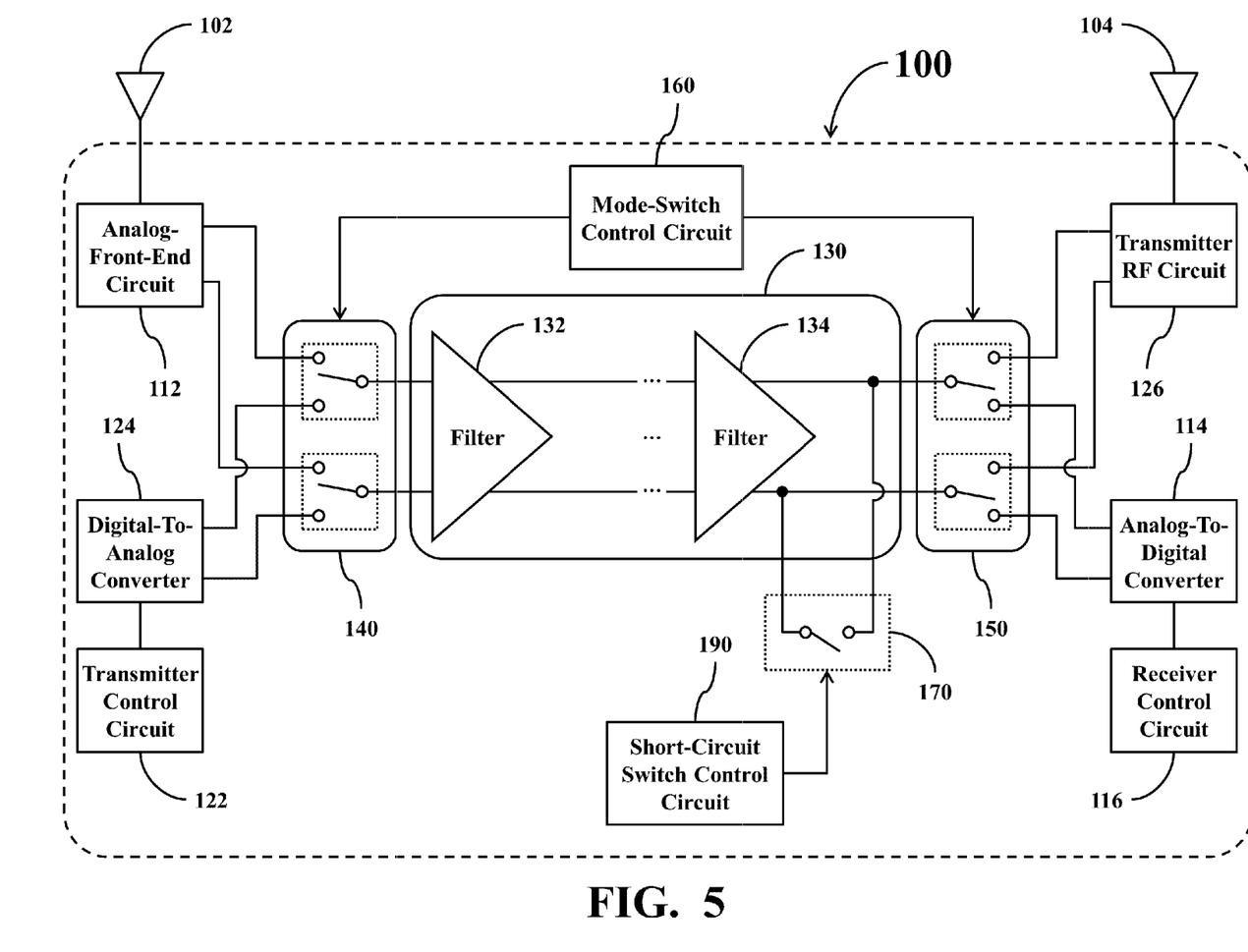

For example, in some embodiments, it may only arrange the first short-circuit switch 170 at the output terminals of one of the filters in the shared filtering circuit 130, while omitting the short-circuit switches after other filters, as shown in FIG. 4 or FIG. 5.

In the embodiment where the filter coupled with the first short-circuit switch 170 is the filter affecting the settling time of the shared filtering circuit 130 most, arranging only one short-circuit 170 can also reduce the time required for the shared filtering circuit 130 to complete the initialization procedure during the transition period while preventing the transceiver control circuit 100 from generating and transmitting erroneous signals to the transmitting antenna 104 during such period.

The foregoing descriptions regarding the connections, implementations, operations, and related advantages of other components in FIG. 1 are also applicable to the embodiments of FIG. 4 and FIG. 5. For the sake of brevity, those descriptions will not be repeated here.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A transceiver control circuit (100) of a transceiver, comprising:
   a receiver circuit (112, 114, 116), arranged to operably process signals received by the transceiver;
   a transmitter circuit (122, 124, 126), arranged to operably process signals to be transmitted by the transceiver;
   a shared filtering circuit (130), comprising a plurality of filters (132, 134) and commonly shared by the receiver circuit (112, 114, 116) and the transmitter circuit (122, 124, 126);
   a first mode-switch (140), coupling with an input terminal of the shared filtering circuit (130), arranged to operably switch signal input paths of the shared filtering circuit (130);
   a second mode-switch (150), coupling with an output terminal of the shared filtering circuit (130), arranged to operably switch signal output paths of the shared filtering circuit (130);
   a mode-switch control circuit (160), arranged to operably control operations of the first mode-switch (140) and the second mode-switch (150);
   a first short-circuit switch (170), coupled between two differential output terminals of one filter in the plurality of filters (132, 134); and
   a short-circuit switch control circuit (190), arranged to operably control operations of the first short-circuit switch (170);
   wherein in a first transition period during which the transceiver transitions from a receiving mode to a transmitting mode, the short-circuit switch control circuit (190) turns on the first short-circuit switch (170) for a first predetermined length of time and then turns off the first short-circuit switch (170).

2. The transceiver control circuit (100) of claim 1, wherein while the transceiver operates under the receiving mode, the mode-switch control circuit (160) controls the first mode-switch (140) and the second mode-switch (150) to respectively couple the signal input paths and the signal output paths of the shared filtering circuit (130) with corresponding circuits in the receiver circuit (112, 114, 116); and while the transceiver operates under the transmitting mode, the mode-switch control circuit (160) controls the first mode-switch (140) and the second mode-switch (150) to respectively couple the signal input paths and the signal output paths of the shared filtering circuit (130) with corresponding circuits in the transmitter circuit (122, 124, 126).

3. The transceiver control circuit (100) of claim 2, wherein when the mode-switch control circuit (160) controls the first mode-switch (140) to switch the signal input paths of the shared filtering circuit (130) from the receiver circuit (112, 114, 116) to the transmitter circuit (122, 124, 126), the short-circuit switch control circuit (190) begins to turn on the first short-circuit switch (170).

4. The transceiver control circuit (100) of claim 2, wherein the first predetermined length of time is longer than or equal to a settling time of a digital-to-analog converter (124) in the transmitter circuit (122, 124, 126).

5. The transceiver control circuit (100) of claim 2, further comprising:
   a second short-circuit switch (180), coupled between two differential outputs of another filter in the plurality of filters (132, 134), and controlled by the short-circuit switch control circuit (190);
   wherein in the first transition period during which the transceiver transitions from the receiving mode to the transmitting mode, the short-circuit switch control circuit (190) turns on the second short-circuit switch (180) for a second predetermined length of time and then turns off the second short-circuit switch (180).

6. The transceiver control circuit (100) of claim 2, wherein the second predetermined length of time is substantially equal to the first predetermined length of time.

7. The transceiver control circuit (100) of claim 2, wherein the second predetermined length of time is different from the first predetermined length of time, but the second predetermined length of time is longer than or equal to a settling time of a digital-to-analog converter (124) in the transmitter circuit (122, 124, 126).

8. The transceiver control circuit (100) of claim 2, wherein in a second transition period during which the transceiver transitions from the transmitting mode to the receiving mode, the short-circuit switch control circuit (190) keeps the first short-circuit switch (170) in a turn-off status.

\* \* \* \* \*